United States Patent [19]
Kozloff et al.

[11] Patent Number: 5,452,874
[45] Date of Patent: Sep. 26, 1995

[54] RETAINER DEVICE FOR AN ELECTRONIC SIGNALLING DEVICE

[76] Inventors: Matthew S. Kozloff; Gale Kozloff, both of 1230 Braeburn Ave., Flossmoor, Ill. 60422

[21] Appl. No.: 269,081

[22] Filed: Jun. 30, 1994

[51] Int. Cl.[6] .................................................. B60R 11/02
[52] U.S. Cl. ................................ 248/222.1; 248/206.2
[58] Field of Search .................... 248/222.1, 205.5, 248/206.2, 223.4, 206.3, 205.1; 224/42.42, 42.45 R, 242, 249, 277, 281

[56] References Cited

U.S. PATENT DOCUMENTS

| Re. 34,120 | 11/1992 | Plahn | 248/206.3 |
|---|---|---|---|
| 3,822,049 | 7/1974 | Saunders | 248/223.4 |
| 4,648,572 | 3/1987 | Sokol | 248/206.2 |
| 4,836,482 | 6/1989 | Sokol | 248/206.3 |
| 4,896,855 | 1/1990 | Furnish | 248/206.3 |
| 4,984,760 | 1/1991 | Cohn et al. | 248/126 |
| 5,020,754 | 6/1991 | Davis et al. | 248/206.3 |

*Primary Examiner*—Leslie A. Braun
*Assistant Examiner*—Anita King
*Attorney, Agent, or Firm*—Gerald S. Geren

[57] ABSTRACT

A device for retaining a beeper in a readable position in a vehicle which is being operated. The device includes a base having a pair of upstanding side walls and a back wall. A pair of rails are positioned from and run from the front to the rear. A latch moveable between open and close position is provided to lock the beeper in position in the keeper. The operator of a vehicle can easily read messages on the display of a beeper by positioning the beeper in the retaining device.

6 Claims, 1 Drawing Sheet

RETAINER DEVICE FOR AN ELECTRONIC SIGNALLING DEVICE

BACKGROUND OF THE INVENTION

This invention relates to a retainer device for an electronic signalling device.

It is currently desirable to use an electronic device known as a beeper to electronically signal the user of the beeper to make telephone calls. These devices are generally small box-like devices, which have a clip on one face for securing the device to a persons belt or similar article and a display at one end, where number or similar characters are displayed.

A transmitter sends a signal to the so-called beeper, which is then translated into a series of readable numbers or into a impulse which then causes the beeper wearer to make a return call.

The use of a beeper with a display number to be called or message is very popular.

The beeper wearer sometimes uses the device at the same time as operating a vehicle, such as an automobile. In connection with the automobile, the wearer then must move his eyes and attention from the road and from operating the vehicle, so as to read the display on the beeper.

This can create a dangerous situation in that the user is no longer focusing his attention on operating the vehicle and is rather focusing his attention on obtaining the information displayed by the beeper.

Devices are known for retaining electronic devices in a vehicle. But, these generally relate to radar detectors. See U.S. Pat. Nos. 4,648,572; 4,836,482 and Re 34,120. A support for an electronic device is shown in U.S. Pat. No. 4,984,760.

These devices are constructed for their particular function and do not address the needs of a vehicle operator relative to an electronic signalling device.

It is thus, an object of this invention to provide a device whereby the beeper user can easily obtain information from the beeper without detracting from the operation of a vehicle.

This and other objects will become apparent following description and appended claims.

SUMMARY OF THE INVENTION

There is provided by this invention a beeper retaining device (sometimes referred to as a beeper keeper) which meets the foregoing object. The retaining device is in a sense a cradle-like device for positioning and securing a beeper. The retaining device is to be mounted on the dashboard of an automobile or in another conspicuous place whereby the user can obtain information displayed by the beeper while still directing attention to the operation of the vehicle.

If the beeper is set in the proper orientation on vehicle dashboard, the beeper display can easily be seen. The retainer is constructed and arranged so that the beeper will be positioned in the retaining device in the proper orientation so as to require a minimum amount of effort to obtain the information displayed thereon.

The retainer is a cradle-like device having a bottom wall, upstanding side and back walls, clip receiving tracks and a securement device or feet at its bottom, which are engagable on a dashboard of a car. Thus, the retaining device can be oriented on the dashboard for sight by the beeper user while requiring the minimum amount of attention to be redirected from the operation of the vehicle.

DESCRIPTION OF THE PREFERRED EMBODIMENTS

Figure 1:
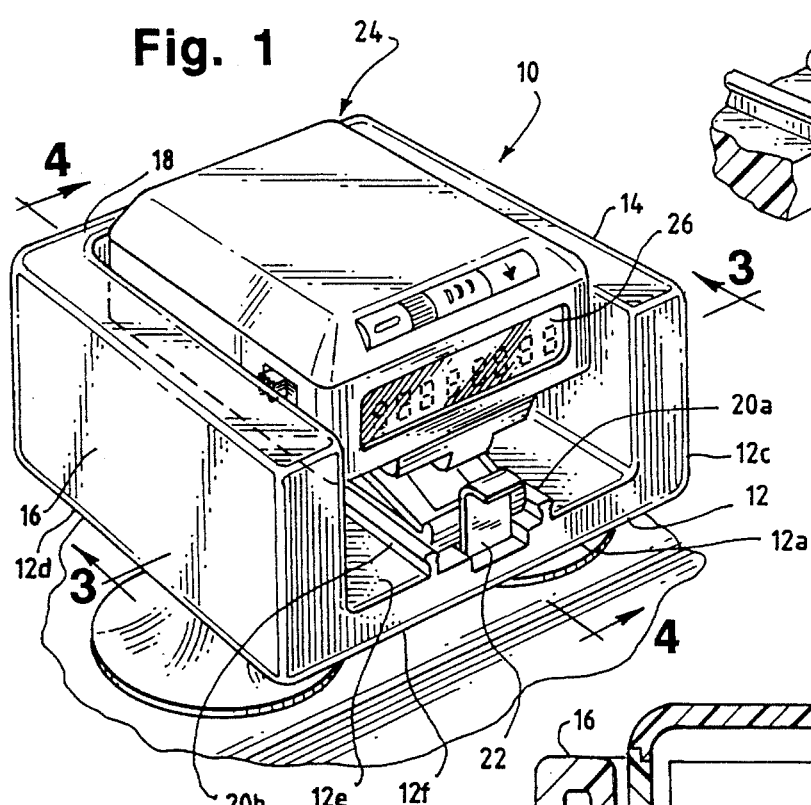
FIG. 1 is a perspective view showing the beeper retaining device with a beeper held in position therein.

Referring to FIG. 1, there is shown a beeper retainer system 10 generally. The retainer includes a base member 12 having front and back edges 12a and 12b, a pair of side edges 12c and 12d an upper surface 12e and lower surface 12f. A pair of side walls 14 and 16 extend upwardly from the side edges 12c and 12d. A back wall 18 extends upwardly from the back edge 12b and may engage the side walls. A pair of clip receiving rails 20a and 20b are provided along the upper surface 12e of the base and extend between the front 12a to the back 12b. The rails are spaced apart the distance of a beeper clip.

It is seen that the rails extend only upwardly a short distance, particularly in comparison to the walls 14 and 16.

Figure 2:
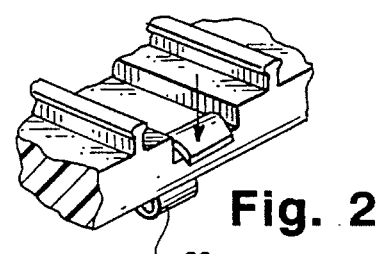
FIG. 2 is a fragmentary view of the front of the beeper retainer showing a depressable latch system used to retain the beeper.
Figure 3:
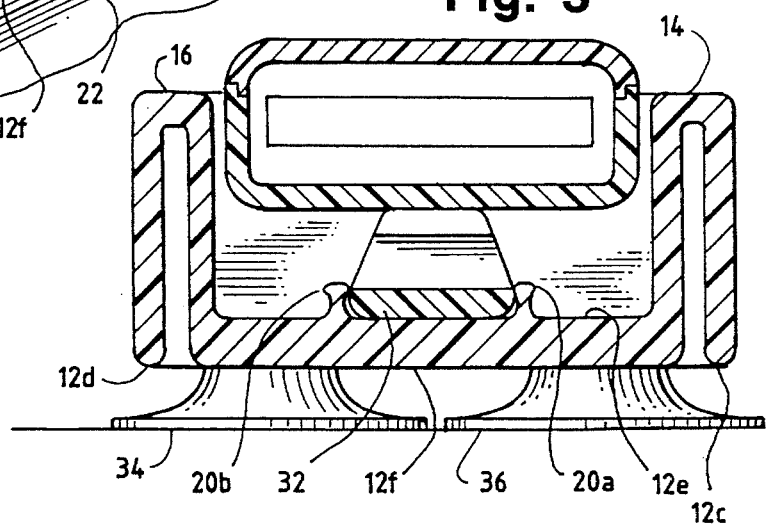
FIG. 3 is a vertical sectional view taken substantially along line 3—3 and showing the construction of the beeper retainer.
Figure 4:
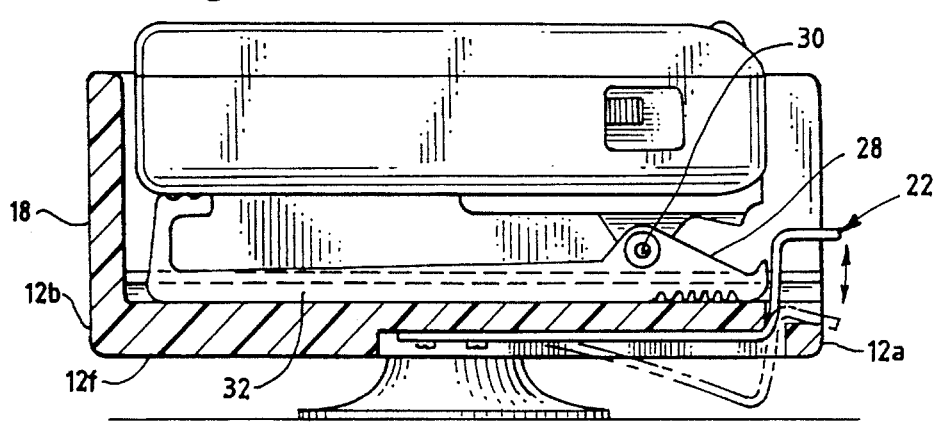
FIG. 4 is a vertical sectional view taken substantially along line 4—4 showing the beeper latch system and a back wall retaining system.

A latch system 22 is provided for securement of the beeper in the retainer and to restrain forward movement. The system is best seen in FIG. 4 and includes a flexible leaf-spring like assembly, which is secured to the lower surface 12f. The latch is in a sense a leaf-spring, which can be depressed downwardly so as to permit the beeper to be positioned in the retainer and released to an upward position whereby the latch 22 can hold the beeper in position. The latch is seen in the upward position or latching position in FIG. 1 and in a downward position in FIG. 2.

The beeper itself 24 includes a generally flat and rectangular housing having a display 26 at its front end. A clip 28 as seen in FIG. 4 is mounted to the back side or back face of the housing. The clip 28 includes a pivot 30 and a belt engaging C-shaped clip 32. The clip is of a size and shape to fit between the rails so as to retain the clip in position between the side and back walls. The latch 22 retains the clip and the beeper in position. It is seen that the beeper has about the same width as the distance between the inner walls 14 and 16 and is also retained by the back wall 18.

In order to retain the beeper on the dashboard of an automobile, a pair of suction-cup-like feet 34 and 36 are mounted to the underside of the retainer 12f so as to extend downwardly therefrom.

In use the retainer is mounted on the vehicle dashboard with the open or front end 12a facing toward the operator. The latch 22 is depressed and then the beeper is slide into the retainer with the display 26 facing forwardly and the clip downwardly between the rails. The latch 22 is then released and the beeper is retained in position.

The user can then operate the vehicle and with only a short glance, see the display or whatever information that is displayed thereon.

It is believed that this provides a safer arrangement for reading the beeper than has been previously available.

Various changes and modifications can be made to the embodiment that is disclosed herein without departing from the spirit and scope of this invention.

We claim as our invention:

1. A retainer device for retaining an electronic signaling device or beeper in a readable position in a vehicle with the beeper positioned forwardly, said retainer device comprising;

a base having a front, side and back edges, and an upper and a lower surface;

a pair of spaced upstanding side walls extending upwardly from the base side edges and adapted to be spaced apart a distance substantially equal to the width of a beeper to be stored;

a back wall extending upwardly from the base back edge so as to define a distance between the base front edge and the back wall adapted to be substantially equal to the depth of a beeper of the type to be retained;

a latch associated with the base front edge and moveable between a retaining position and a released position; and a pair of spaced upstanding protrusions connected to the base at a location inwardly of said side walls, said protrusions extending upwardly from the base a distance less than the heights of said side walls at at location inwardly of said side walls, said protrusions adapted to be spaced apart a distance effective to receive a clip associated with a beeper.

2. A retainer as in claim 1 wherein said protrusions comprise a pair of rails spaced from each other and extending from the front to the back of the retaining device.

3. A retainer as in claim 1 wherein said latch comprises a mechanism biased to the retaining position.

4. A retainer as in claim 1 wherein at least one foot-like securement device extends downwardly from the base for securement to a support surface.

5. A retainer as in claim 4 where at least one said foot-like securement devices comprise a suction cup-like device.

6. A retainer device in combination with an electronic signalling device or beeper having a front and a back face, a pair of ends with a display at one end, and a clip secured to the back face, said retainer device comprising;

a base having a front, side and back edges, and an upper and a lower surface;

a pair of spaced upstanding side walls extending upwardly from the base side edges and spaced apart a distance substantially equal to the width of the beeper to be stored;

a back wall extending upwardly from the base back edge so as to define a distance between the base front edge and the back wall substantially equal to the depth of a beeper of the type to be retained;

a latch associated with the base front edge and movable between a retaining position and a released position; and a pair of spaced upstanding clip receiving protrusions connected to the base at a location inwardly of said side walls, said protrusions extending upwardly from the base a distance less than the height of said side walls and spaced apart a distance effective to receive the clip associated with the beeper, whereby the device fits between the retainer side walls, back wall and latch, and said clip fits between the clip receiving protrusions.

* * * * *